G. MILNE & W. H. GANTS.

Assignors of one-third to P. B. QUINLAN.

WATER CLOSET.

No. 10,377. Reissued Aug. 28, 1883.

Witnesses:
W. Voit.
Wm. F. Clark

Inventors:
George Milne and
William H. Gants,
By their attorney.
Bonn & Adams

N. PETERS, Photo-Lithographer, Washington, D. C.

UNITED STATES PATENT OFFICE.

GEORGE MILNE AND WILLIAM H. GANTS, OF SAN FRANCISCO, CALIFORNIA, ASSIGNORS OF ONE-THIRD TO PETER B. QUINLAN, OF SAME PLACE.

WATER-CLOSET.

SPECIFICATION forming part of Reissued Letters Patent No. 10,377, dated August 28, 1883.

Original No. 226,338, dated April 6, 1880. Application for reissue filed April 12, 1881.

*To all whom it may concern:*

Be it known that we, GEORGE MILNE and WILLIAM H. GANTS, of the city and county of San Francisco, in the State of California, have invented certain new and useful Improvements in Water-Closets; and we do hereby declare that the following is a full, clear, and exact description thereof, reference being had to the accompanying drawings.

Our invention relates to water-closets in which a standing body of water is maintained to receive the soil and seal the closet, and in which a pull-valve for emptying the bowl and a float-valve for admitting a supply of clean water are employed to operate the closet.

The invention will be understood as hereinafter set forth and claimed.

Figure 1:
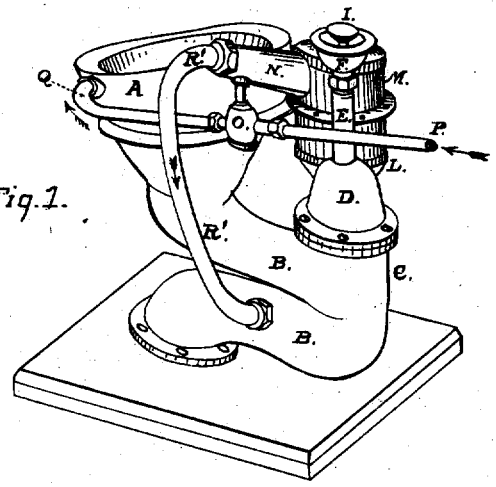
Figure 2:
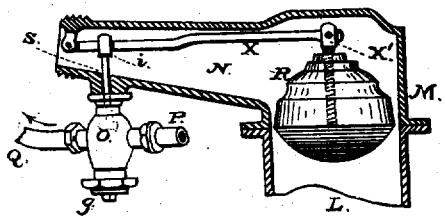
Figure 3:
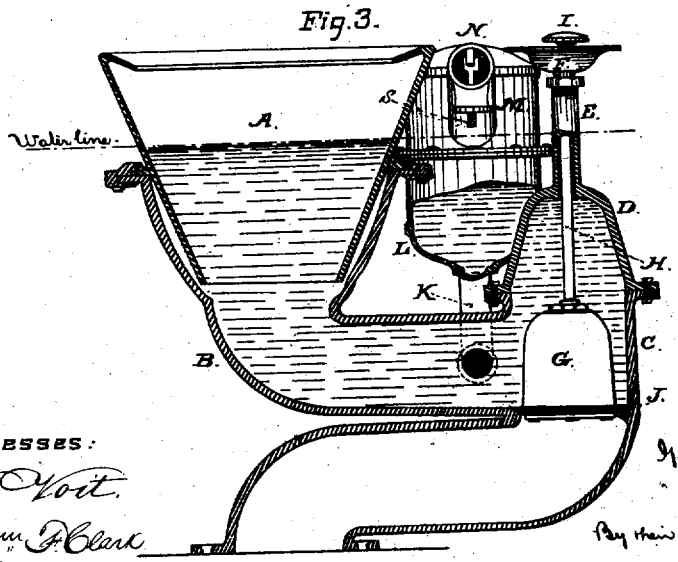

Referring to the accompanying drawings, Figure 1 is a perspective view of our improved water-closet. Fig. 2 is a vertical longitudinal section through the float-chamber and its extension. Fig. 3 is a vertical longitudinal section through the bowl, soil-pipe, and valve-chamber.

A is the bowl. B is the waste-pipe through which the contents of the closet are discharged, and C is the chamber for the pull-valve. We make the waste-pipe with a return-bend and place the seat for the pull-valve G in the bend and on a level with the flow or bottom of the upper branch or limb of this pipe. The pull-valve G, that controls this outlet, is inclosed by and operated within a chamber, C, formed at the end of the bend of the waste-pipe, and it is attached to and operated by a rod and handle, H I, in the ordinary manner. The upper part of this valve G we make spherical or conical on that portion of its surface around the point where the lifting-rod and the valve are connected, and the top part of the chamber C we make to conform to the shape and size of this valve, so that when the valve is drawn up to empty the closet the space in the top of the chamber will be filled by the valve. The body of the chamber C is formed on the end of the pipe B, that receives the bowl, and the upper part, that is designed to receive and be filled by the valve while the contents are being discharged, is a separate cap or piece, D, which is secured to the top of the chamber by means of through-bolts passing through flanges provided on the two parts. The valve G has a rubber ring or gasket, J, secured around its lower end, so as to make a tight joint when the valve is seated upon the projecting rim of the opening, and it is made solid of suitable weight to drop rapidly to its seat when released. From the top of the spherical or conical chamber D we lead a tubular extension, E, for the valve-rod H to work in, and on the top of this tube is fixed the cup F, for the lifting-handle I, in the usual manner. We give this valve-chamber D a position below the water-line, or the level of the standing body of water held in the closet, so that the chamber D is kept filled with water and no air-space is suffered to exist above the valve. By such construction and arrangement of the pull-valve and chamber we avoid the deposit or attachment of soil and other matter from the closet upon and to the surface of the pull-valve, particularly at the top, where the shape of the valve affords a chance for matter to lodge and be raised or allowed to rise into the upper part of the chamber, above the valve. In construction, where the pull-valve works partly in and partly out of water, such imperfect action of the closet gives rise to the creation and accumulation of unpleasant and unhealthy odors and vapors, that are forced out or escape from the closet and into the apartment whenever the contents are discharged. By placing the pull-valve chamber D below the water-line and making the valve of a shape and size to fill its chamber when raised, we remedy these defects and produce a closet which is self-cleaning.

The independent chamber for the float is formed of the two parts L M. The part L is connected by a short pipe or tube, K, with the waste-pipe B at some convenient point above the pull-valve opening or seat, so that the water maintained in the bowl and valve-chamber shall also stand at the same height in the float-chamber, while the part M is a separate piece or top, that is tightly fastened upon the lower part of the chamber, but is capable of being removed in repairing or adjusting the closet. The upper part of this chamber has a tubular extension, N, near the end of which is placed and connected the supply-valve O. This extension serves to inclose the float-lever X, so that all the operative parts shall be incased with the float in a sealed chamber, having no communication between the outside atmosphere and the air-space existing in the upper part, M N, of the chamber. From the upper part of this chamber we connect the overflow-pipe R′, which is carried down to and into the side of the waste-pipe B at some convenient point below the seat of the pull-valve G, so as to provide a discharge for the overflow that shall remain unobstructed. This construction and arrangement enables us to keep the float and connections always clean and free from deposits of any matter, and to preserve the discharge for the overflow or surplus water open and free from liability to clog or be stopped up, for at the time of emptying the closet the water is also being discharged from the float-chamber into the waste-pipe through the connection K, so that no matter can enter the float-chamber, but it is compelled to pass out and down into the waste-pipe connecting with the sewer.

The float R nearly fills its chamber; but it is made sufficiently smaller in diameter, so as to have a free vertical movement in the chamber. The rod X, that carries the float, is pivoted to a lug or fixed point provided in the chamber and at the outer end of the extension N, and the float is suspended from its free end by means of a short screw, X′, working in a nut fixed in the top of the float, by which the distance of the float below this end of the lever can be increased or diminished. By this means the float is caused to meet and be raised by the water entering the float-chamber through the inlet K at a point sooner or later with respect to the flow of the water upward, and the supply of water admitted through the valve O can be regulated as may be required. The lever X is connected with a pin or spindle, S, which works through a gland or packed aperture in the side of the extension N, and into the body of the valve that is secured to the outside of the extension at this point. The weight of the float is thrown upon this pin when the water is discharged from the chamber M, and the end of the pin then forces open the valve and admits the water into the bowl from the pipe P, and through the pipe Q, that connects the valve with the bowl. Thus every time when the pull-valve is lifted and the water allowed to run out of the closet, the float drops and operates the valve O to admit a fresh supply of water and charge the bowl and chambers until the water rises to the the required height, when the float, lifted by the water in the chamber L M, raises the pin S and shuts off the supply-valve. The pin or spindle S has a shoulder, *i*, near its upper end, below which is a washer, which makes a close joint when the pin is depressed. We also make a deep groove around the lower end of the pin, so as to reduce its size, but leaving the extreme end of the full size. This reduced portion takes up less space in the water-way, yet leaves a broad surface to press upon the valve.

The operation will then be as follows: When the valve G is down, the water stands to the proper height in the bowl A, float-chamber L, and chamber C D, and in the tube E above the valve. After use, the closet is emptied by raising the valve G by means of the handle I, in the usual way, which draws the valve G up into the top of the valve-chamber D, so that this chamber receives and is filled by the valve and leaves the discharge-passage clear and unobstructed. This allows the water and contents of the bowl to pass out freely through the waste-pipe and valve-opening. As the water in the float-chamber passes out through the pipe K the float drops down and causes the rod or pin S to press the valve from its seat and admit water through the supply-pipe into the bowl. When the valve G is released, it instantly closes and shuts off the outflow through the waste-pipe, after which the water will accumulate above the valve, so as to fill the upper bend of the waste-pipe bowl and float-chamber until the float is carried high enough to raise the pin free from the ball and allow it to close the water-passage from the main to the bowl. The point at which the pin frees itself from the closing ball-valve determines the height of the water in the bowl. Any overflow from the float-chamber passes through the overflow-pipe R′ into the second bend of the waste-pipe, below the valve G, so that it is impossible for the water to rise higher than the overflow. The water will then stand on the same level in the bowl, float-chamber, and tube above the valve G, so that every passage through which foul gases from the sewer or waste-pipe might penetrate is sealed with water, and the closet thus positively trapped. It will be impossible for the water to siphon off through the overflow-pipe, as any lowering of the water-level in the float-chamber opens the water-valve, and the waste or loss is replenished.

We thus provide a simple and effective valve arrangement for discharging the water from the bowl and supplying the necessary amount for a fresh charge. The arrangement is such that the operative parts can readily be got at for adjustment or repairs.

Having thus fully described our invention, what we claim, and desire to secure by Letters Patent, is—

1. In a water-closet, a separately-formed cylindrical float-chamber formed of two parts joined on a circumferential line, having a closed extension secured to the upper part thereof, which extension incases the entire float-lever, the whole being adapted to be secured to the closet by connecting-pipes, substantially as herein set forth.

2. In a water-closet, the combination of the float-chamber and closed extension thereof, and the float and float-lever wholly inclosed in said chamber and extension, with a connection to the waste-pipe which forms the overflow for the closet, as herein set forth.

3. In a water-closet, the combination, with the float-chamber and tubular extension thereof in which the float-lever is inclosed, of said float-lever and the float, a water-supply cock connected directly with the extension and controlled from the float-lever, and an overflow-passage engaging with the end of the extension and connecting the extension with the waste-pipe, as set forth.

4. In a water-closet, the combination, with the bowl, waste-pipe, valve-chamber, and valve, of a separately-formed float-chamber provided with water-connections, whereby it will be filled and emptied with the bowl, said float-chamber being formed in two parts joined on a horizontal line, and having an extension forming an integral portion of the upper part for containing the float-lever, and an overflow-pipe secured upon and forming a continuation of said extension, and connected with the waste-pipe below the valve, to allow the overflow-water to run off, and at the same time close the extension, substantially as herein set forth.

5. In a water-closet, a float-chamber connected to the closet, so as to receive water therewith, and having a closed tubular float-lever-containing extension provided with a screw-threaded end and a connection for the float-lever thereon, and an overflow-pipe provided with means for engaging with the end of the extension, substantially as set forth.

6. The float-chamber L M, with its tubular extension N, and overflow-pipe R′, connected with the upper bend of the waste-pipe by the short pipe K, in combination with the float R, suspended on a hinged lever, X, said float being arranged to operate the supply-valve, substantially as above specified.

7. The valve-chamber O, attached to the under side of the tubular extension N of the float-chamber, with its valve, in combination with the hinged lever X, float R, and presser-pin S, substantially as and for the purpose described.

8. The combination, with the bowl A, having the recurved waste-pipe B, of the chamber L M, having the extension N and overflow-pipe R′, and connected with the upper bend of the waste-pipe by the pipe K, float R, and hinged lever X, substantially as and for the purpose set forth.

9. The combination, with the bowl A, having the recurved waste-pipe B, and valve G, with the stem H and chamber D E, of the chamber L M, having the extension N, pipe R′, valve-chamber O, float R, presser-pin S, lever X, and pipes K Q, substantially as and for the purpose set forth.

In witness that we claim the foregoing we have hereunto set our hands and seals.

GEO. MILNE. [L. S.]
WM. H. GANTS. [L. S.]

Witnesses:
EDWARD E. OSBORNE,
WM. F. CLARK.